United States Patent [19]
Stone

[11] Patent Number: 5,933,546
[45] Date of Patent: Aug. 3, 1999

[54] METHOD AND APPARATUS FOR MULTI-RESOLUTION IMAGE SEARCHING

[75] Inventor: Harold S. Stone, Princeton, N.J.

[73] Assignee: NEC Research Institute, Inc., Princeton, N.J.

[21] Appl. No.: 08/643,691

[22] Filed: May 6, 1996

[51] Int. Cl.$^6$ .......................... G06K 15/316; G06K 9/64
[52] U.S. Cl. .......................... 382/278; 382/206; 382/207; 382/209; 382/210; 382/218; 382/219; 382/276; 382/277; 382/279; 382/280
[58] Field of Search ................... 382/276, 277, 382/278, 279, 280, 209, 210, 218, 219, 206, 207

[56] References Cited

U.S. PATENT DOCUMENTS

| | | | |
|---|---|---|---|
| 4,200,861 | 4/1980 | Hubach et al. ................. | 340/146.3 Q |
| 5,040,223 | 8/1991 | Kamiya et al. ................. | 382/4 |
| 5,067,162 | 11/1991 | Driscoll, Jr. et al. ............... | 382/5 |
| 5,253,530 | 10/1993 | Letcher, III ................. | 73/602 |
| 5,392,255 | 2/1995 | LeBras et al. ................. | 367/50 |
| 5,394,349 | 2/1995 | Eddy ................. | 364/725 |
| 5,546,477 | 8/1996 | Knowles et al. ................. | 382/242 |
| 5,659,626 | 8/1997 | Ort et al. ................. | 382/125 |

OTHER PUBLICATIONS

J. Li et al., "Object recognition with a wavelet-transform-based joint transform correlator," Optical Engineering, vol. 35, No. 3, pp. 775–777 (Mar. 1996).

F. Ahmed et al., "Wavelet transform-based correlator for the recognition of rotationally distorted images," Optical Engineering, vol. 34, No. 11, pp. 3187–3192, (Nov. 1995).

Q. Tieng et al., "Complex daubechies wavelet based affine invariant representation for object recognition," Proceedings of the International Conference on Image Processing (IC, Austin, Nov. 13–16, 1994), vol. 1, No. Conf. 1, pp. 198–202 (Nov. 1994).

Y-S. Cheng et al., "Rotational invariant pattern recognition using a composite circular harmonic and 2D isotropic Mexican-hat wavelet filter," Optics Communications, vol. 112, No. 1/2, pp. 9–15 (Nov. 1994).

Y. Sheng, et al., "Optical wavelet matched filters for shift-invariant pattern recognition," Optics Letters, vol. 18, No. 4, pp. 299–301 (Feb. 1993).

P.P. Vaidyananthan, "Orthonormal and Biorthonormal Filter Banks as Convolvers, and Convolutional Coding Gain," IEEE Trans. on Signal Processing, vol. 41, No. 6 (Jun. '93), pp. 2110–2130.

M. Flickner et al, "Query by Image and Video Content: The QBIC System," Computer (Sep. '95), pp. 23–32.

*Primary Examiner*—Leo H. Boudreau
*Assistant Examiner*—Kanji Patel
*Attorney, Agent, or Firm*—Jeffrey J. Brosemer; Andrew G. Isztwan

[57] ABSTRACT

A multiresolution method and apparatus for searching of a database of images where the search is performed on compressed images, without first decompressing them. The method searches the database of compressed images first at a low resolution to obtain the relative quality of a match between a search template and a candidate image. If the match is below a particular threshold, the search is terminated without committing any further computational resources to the search. Conversely, if the match is above a particular threshold, the method enhances the resolution of the candidate image and then performs another match. As long as the relative quality of the match is above the particular threshold, the resolution of the candidate image is successively enhanced, until a match determination is made at a full resolution of the candidate image.

34 Claims, 7 Drawing Sheets

METHOD AND APPARATUS FOR MULTI-RESOLUTION IMAGE SEARCHING

TECHNICAL FIELD

This invention relates to the field of image storage and retrieval and in particular to a method and apparatus for searching for a particular image contained within a database of images.

DESCRIPTION OF THE ART AND PROBLEM

Image databases are databases that contain digital data of images and are finding ever-increasing uses in business and entertainment. The widespread use of image databases, however, is intensifying the need to develop more effective ways of searching such databases.

By way of background, a database is a collection of related data. Oftentimes, the data in a database are structurally organized as tables, fields and records. Generally, each record in the database possesses a set of attributes and a user may wish to conduct a search of the database based upon a value of one or more of the attributes. For example, in a database of football statistics, one may desire to search for all quarterbacks who completed 100 or more passes in a single season, etc.

In conducting such a search, it is assumed that each record possesses several attributes and the user wants to search for records that possess certain values of certain attributes. The specification of which records are desired is called a query and is usually restricted to one of three types: a) A simple query which specifies a specific value for a specific attribute; e.g., THROWINGARM=LEFT; or THROWINGARM=RIGHT; b) a range which specifies a specific range of values for a specific attribute; e.g., WEIGHT<220 or 180<WEIGHT<220; and c) a BOOLEAN such as (THROWINGARM=LEFT) AND (HEIGHT>6') AND (COMPLETIONS>99)).

Unfortunately, such query-based methods do not solve the problem of searching an image database because image data is oftentimes not annotated with attribute descriptions. Consequently, an increasing interest and continuing need exists for developing search and retrieval methods which efficiently, quickly and accurately search a database of images.

Consequently, the prior art has has shown an increasing interest in searching image databases by image content. See, for example, M. Flickner et al., "Query by Image and Video Content: The QBIC System", Computer, Vol. 28, No. 9., pp. 23–32, September 1995. To perform such a content-based image search, one would typically select an image template and query the database to find images that "look like" the image template. An alternative form of this question is "where in a waveform B does a signal A occur?"

In providing an answer to this latter question, the prior art has utilized correlation techniques from signal-processing to measure similarities of images in much the same way that they are used to measure the similarities of signals. Such correlation techniques require the computation of the circular correlation of an image x with a search pattern y where the circular correlation is defined to be the mathematical operation given by the formula:

$$(x \cdot y)_j = \sum_{i=0}^{i=N-1} x_{(i+j) \bmod N} y_i.$$

As used throughout the present application, input variables are denoted by lower case letters x and y where x is one of several possible images and y is a fixed pattern or subimage sought in images contained in an image database. Note that while images are two dimensional, all of the discussion herein is for one-dimensional row vectors x and y thereby simplifying the notation used. Those skilled in the art will readily appreciate that the extension to two dimensions is straightforward. Additionally, and unless explicitly stated otherwise, the x and y vectors both have a length depicted as N. For search operations, if the sought pattern y is shorter than x, then, y is padded to length N by adding 0s to its length. Finally, $X^T$ is used to denote the transpose of x, which changes the row N×1 row-vector x into a 1×N column vector.

The fundamental operation for search operations is the circular correlation of x to y which is defined to be the mathematical operation given by the formula:

$$(x \cdot y)_j = \sum_{i=0}^{i=N-1} x_{(i+j) \bmod N} y_i.$$

Typically, the circular correlation is used together with other functions such that a new function is produced whose peaks indicate positions within x that best match y. In operation, the circular correlation produces a vector of length N from two vectors of length N.

As used herein, the notation $(x \cdot y)_{i \downarrow R}$ denotes a subsampling of the correlation operation by taking components whose indices are equal to i modulo R. For example, if R=4 and i=1, the subsampling operations extracts elements 1, 5, 9, 13, . . . from the circular correlation of x and y. Consequently, $(x \cdot y)_{i \downarrow R}$ is called subband i of $(x \cdot y)$.

The invention of the present application advantageously uses wavelet transforms of images. A wavelet transform of an image x is for a wavelet transform H, where H is an N×N matrix, denoted by a N-vector H $x^T$. The wavelet transform is advantageous for image compression because it leads to transformed vectors with many components of small magnitude, which can be represented by a relatively small number of bits. Often these components are replaced by 0s which are efficiently encoded in the wavelet transform. Those skilled in the art can readily appreciate that not only are the image representations reduced, but the time required to process the wavelet transforms is reduced as well because any zero components do not have to be processed during arithmetic operations.

In the discussion that follows, it is assumed that the wavelet transform matrix H has a special structure. Specifically, it is assumed that H is block diagonal with a block size of R. By definition, this means that H may be partitioned into individual blocks having a size R×R, and that all of the blocks within H—except for the individual blocks that fall on the diagonal contain only 0s. By way of example, the matrix Y below is a block diagonal matrix having a block size of 3. Its diagonal blocks are identical to each other, and the following discussion is limited to such block diagonal matrices which have identical blocks down their diagonal.

$$Y = \begin{bmatrix} 1 & 1 & 0 & 0 & 0 & 0 \\ 0 & 1 & 0 & 0 & 0 & 0 \\ 2 & 1 & 1 & 0 & 0 & 0 \\ 0 & 0 & 0 & 1 & 1 & 0 \\ 0 & 0 & 0 & 0 & 1 & 0 \\ 0 & 0 & 0 & 2 & 1 & 1 \end{bmatrix}.$$

In an article entitled "Orthonormal and Biorthonormal Filter Banks as Convolvers and Convolutional Coding Gain", which appeared in IEEE Trans. On Signal Processing, Vol. 41, No. 6., pp. 2110–2130, June 1993, P. Vaidyanathan proved a convolutional theorem for transformed vectors (hereinafter referred to as "Vaidyanathan's theorem"). Vaidyanathan's theorem states that given wavelet transforms of x and y, then some of the components of the circular convolution of x and y may be found without first transforming x and y from the wavelet domain back to the pixel domain. Graphically, the theorem may be depicted as in FIG. 1.

According to this theorem and with reference to FIG. 1, when H is block diagonal having a block size R with identical blocks along the diagonal, and $H^T H = I_N$, where $I_N$ is the identity matrix of size N, then subband 0 of the circular correlation of x and y is obtained from the wavelet transforms of x and y, by computing the circular correlations of all subbands of x and y and adding these correlations together, component by component.

Note that the computation does not require that the wavelet transforms be inverted. For example, if N=32 and R=4, each subband contains 8 components, and there are four such subbands. Vaidyanathan's theorem requires the formation of 4 subbands of x and y, the calculation of 4 circular correlations each of length 8, and then the addition of these together component by component to produce a single vector of length 8. This resulting single vector is exactly equal to subband 0 of the circular correlation of the full vectors x and y.

Subband 0 of the circular correlation gives only a low-resolution version of the circular correlation. And while it may indicate that a match for a particular search may be present, there remains the possibility that no match exists. Therefore, an effective search method must be able to produce the remaining components of the circular correlation to resolve if a match is present. Conveniently, Vaidyanathan's theorem may be extended to the computation of other subbands of a circular correlation as indicated in FIG. 2.

With further reference to FIG. 2, to compute Subband j, the vector x is cyclically shifted to left by j positions, and then processed by the same mechanism that computes Subband 0. One overwhelming problem with this approach, however, is that it is excessively computationally expensive. For example, if it is assumed that the "cost" of computing the wavelet transform and the inverse wavelet transform are about equal, then the prior art method depicted in FIG. 2 indicates that the cost of computing all of the subbands of the cyclic correlation of x and y is the cost to compute R direct wavelet transforms for x and one for y, together with the cost of the cyclic correlations.

However, the cyclic correlation of x and y may be computed by an alternative method, namely by taking inverse transforms of $Hx^T$ and $Hy^T$, followed by cyclic correlations in the pixel domain. This alternative method incurs a cost equivalent to two wavelet transforms plus the cost of the cyclic correlations. Vaidyanathan's method requires R−1 more wavelet transforms. The net cost comparison depends on the relative cost of the cyclic correlations when done by Vaidyanathan's method and when done in the pixel domain by inverting the transforms first.

Clearly, the cost of the cyclic correlations depends on how they are computed. As indicated by FIG. 3(a), the well-known convolution theorem provides an efficient way to compute these correlations. With reference to FIG. 3(a), there is shown a method for computing the circular correlation of x and y. A straightforward implementation of this computation requires $N^2$ multiplications A more efficient implementation for sufficiently large values of N is shown in FIG. 3(b). As shown in FIG. 3(b), to compute the circular correlation of x and y, one must: first, compute their Fourier transforms; second, multiply the Fourier coefficients $X_i$ and $Y_i$, point by point in the frequency domain; and third, take the inverse Fourier Transform of the point-by-point product. (Note that the notation $\hat{F}$ shown in FIG. 3(b) denotes taking the complex conjugate of a Fourier Transform, and incurs a cost equal to that of taking the Fourier transform itself).

As one skilled in the art can readily appreciate, the Convolution Theorem improves the efficiency of the calculation because each forward or inverse transform requires only about 5 N log N operations, and the point-by-point multiply requires only N. This is usually much less than the $N^2$ operations required to compute the circular convolution by more naive methods. To compare Vaidyanathan's method to the straightforward one, the costs of each method are computed as follows:

Straightforward Method:
1) Invert $Hx^T$ and $Hy^T$. (Cost: 2 wavelet transforms).
2) Calculate Fourier Transforms of x and y (Cost: 2 N log N operations).
3) Do the point-by-point multiplies. (Cost: N operations).
4) Transform back to the pixel domain. (Cost: N log N operations).

Total cost: 2 wavelet transforms plus 3 N log N+N operations.

Vaiydyanathan's method:
1) For each subband, calculate the wavelet transform of x. (Cost: R wavelet transforms, or R−1 wavelet transforms if Subband 0 is available already).
2) For each subband, calculate R cyclic correlations of length N/R. (Cost: per subband it is N log N−N log R operations; in total it is RN log N−RN log R).

As can be readily seen, the total cost for Vaidyanathan's method is about R times as large as the straightforward method, which moves first to the pixel domain and then does fast correlation there. The straightforward method is not progressive. It requires a full calculation to obtain any significant search result. And while Vaidyanathan's method is progressive and can be discontinued before performing all of the operations, it is simply too computationally expensive to use in practice.

Consequently, a continuing need exists in the art for methods and apparatus which conveniently, efficiently and inexpensively permit the searching of a large number of candidate images contained within an image database.

SOLUTION AND SUMMARY OF THE INVENTION

The above problems are solved and an advance is made over the art according to the principles of the present invention whereby images are highly-compressed through the use of wavelet compression techniques, and Fourier correlation techniques are utilized to perform a high-speed search and retrieval of images contained in an image database.

The method advantageously permits the searching of a database of images where the search is performed on the compressed images, without first decompressing them. Specifically, the method of the present invention operates by searching the database of compressed images first at a low resolution to obtain the relative quality of a match between a search template and a candidate image. If the match is below a particular threshold, the search may be terminated without committing any further computational resources to the search. Conversely, if the match is above a particular threshold, the method enhances the resolution of the candidate image and then performs another match. As long as the relative quality of the match is above the particular threshold, the resolution of the candidate image is successively enhanced, until a match determination is made at a full resolution of the candidate image.

Viewed from another aspect, the present invention provides an apparatus for the efficient searching of images contained in an image database. Further features and advantages of the present invention, as well as the structure and operation of various embodiments of the present invention are described in detail below with reference to the accompanying drawings.

BRIEF DESCRIPTION OF THE DRAWINGS

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

The invention of the present application utilizes a multiresolution technique which overcomes the debilitating inefficiency associated with the prior art. By way of additional background, in multiresolution wavelet decompositions there exist a sequence of matrices $H_1$, $H_2$, etc. such that each successive matrix produces finer and finer wavelet transforms. In the following example, $H_2$ is a coarse transform that is block diagonal with blocks of size $R^2$, and operates on $R^2$ subbands, each of length $N/R^2$. $H_1$ is a fine transform matrix that is block diagonal with blocks of size $N/R$, and operates on R subbands, each of length $N/R$. There exists an update matrix $U_{12}$, that refines $H_2$ into $H_1$ by the equation:

$$H_1 = U_{12} H_2.$$

The matrix $U_{12}$ is block diagonal with blocks of size $R^2$. The blocks of $U_{12}$ consist of R interlaced copies of the block matrix that is on the diagonal of $H_1$. For example, let $H_2$ be the coarse wavelet transform given by:

$$H_2 = 0.5 \cdot \begin{bmatrix} 1 & 1 & 1 & 1 & 0 & 0 & 0 & 0 \\ 1 & -1 & 1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & 1 & 1 & -1 & -1 \\ 0 & 0 & 0 & 0 & 1 & -1 & -1 & 1 \end{bmatrix}$$

The fine transform is given by the matrix $H_1$ whose structure is given by:

$$H_1 = \sqrt{2}/2 \cdot \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & 1 \\ 0 & 0 & 0 & 0 & 0 & 0 & 1 & -1 \end{bmatrix}$$

The update matrix $U_{12}$ is the matrix given by:

$$U_{12} = \sqrt{2}/2 \cdot \begin{bmatrix} 1 & 0 & 1 & 0 & 0 & 0 & 0 & 0 \\ 0 & 1 & 0 & 1 & 0 & 0 & 0 & 0 \\ 1 & 0 & -1 & 0 & 0 & 0 & 0 & 0 \\ 0 & 1 & 0 & -1 & 0 & 0 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 1 & 0 & -1 & 0 \\ 0 & 0 & 0 & 0 & 0 & 1 & 0 & -1 \end{bmatrix}$$

Note that the pattern of 1s and −1s in the one-step update matrix $U_{12}$ is the same as in the fine wavelet transform matrix except that the 1s and −1s in $U_{12}$ are interlaced every 2 apart and they lie within blocks of size 2 in $H_1$ and within blocks of size 4 within $U_{12}$.

Figure 1:
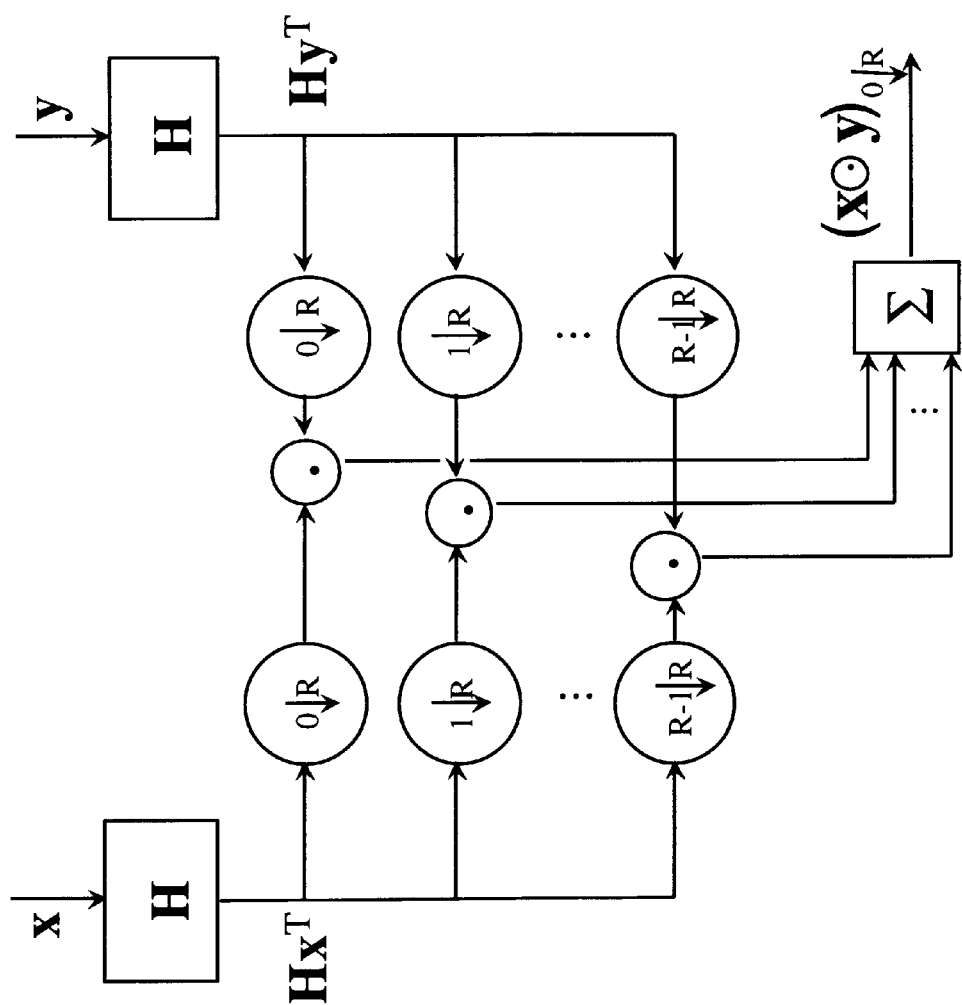
FIG. 1 is an illustration of a prior art method for generating subband 0 of a circular correlation.
Figure 2:
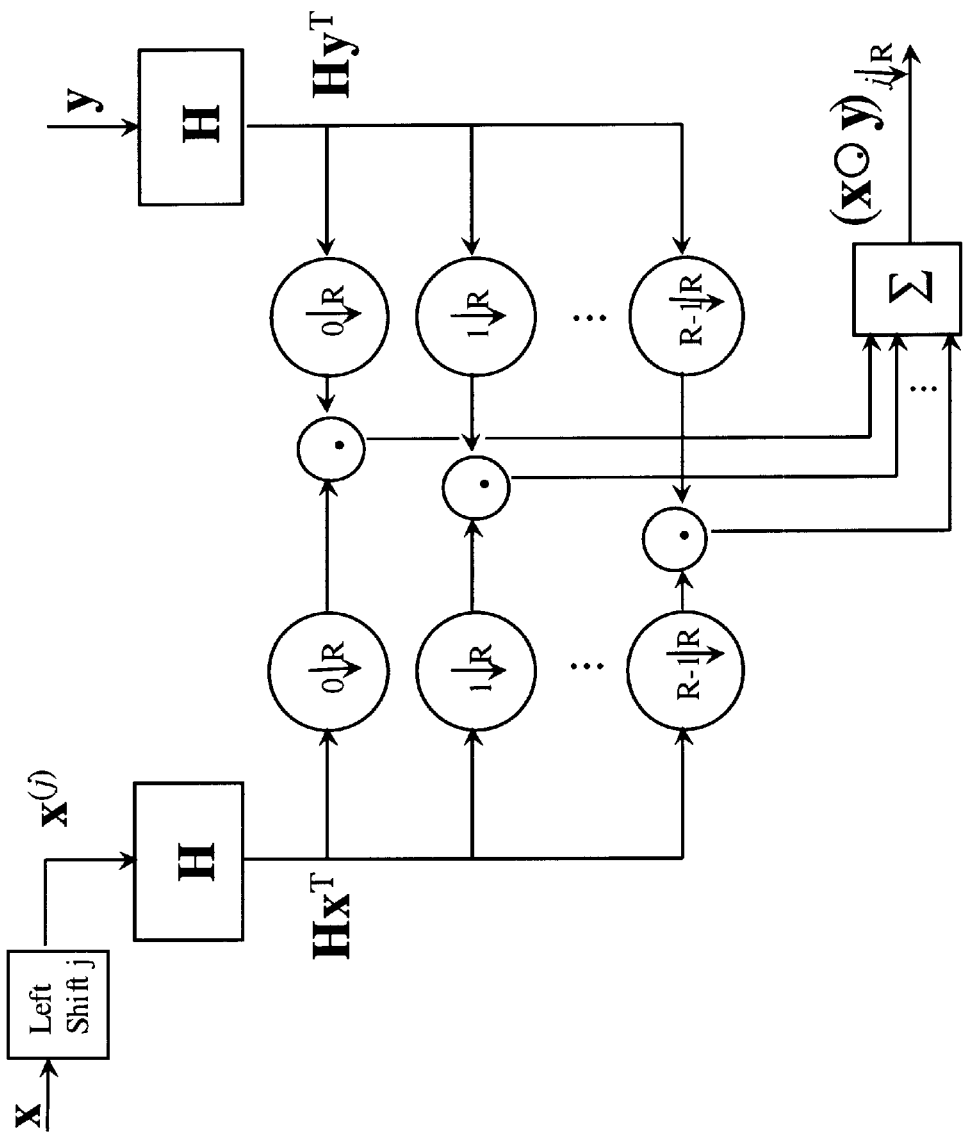
FIG. 2 is an illustration of a prior art method for generating other subbands of a circular correlation.
Figure 3:
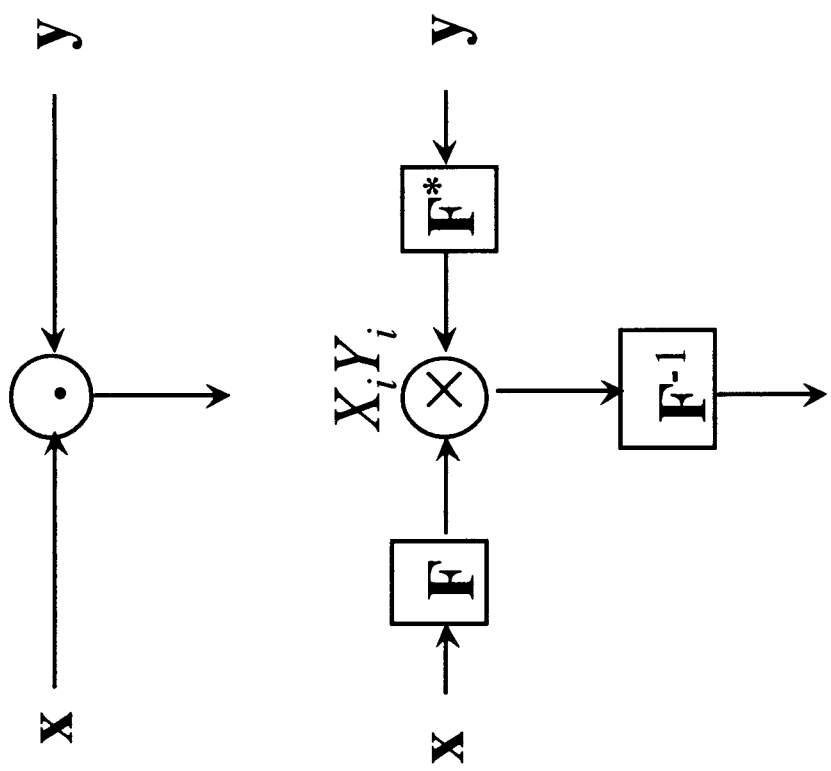
FIG. 3 is an illustration depicting a convolution method.
Figure 4:
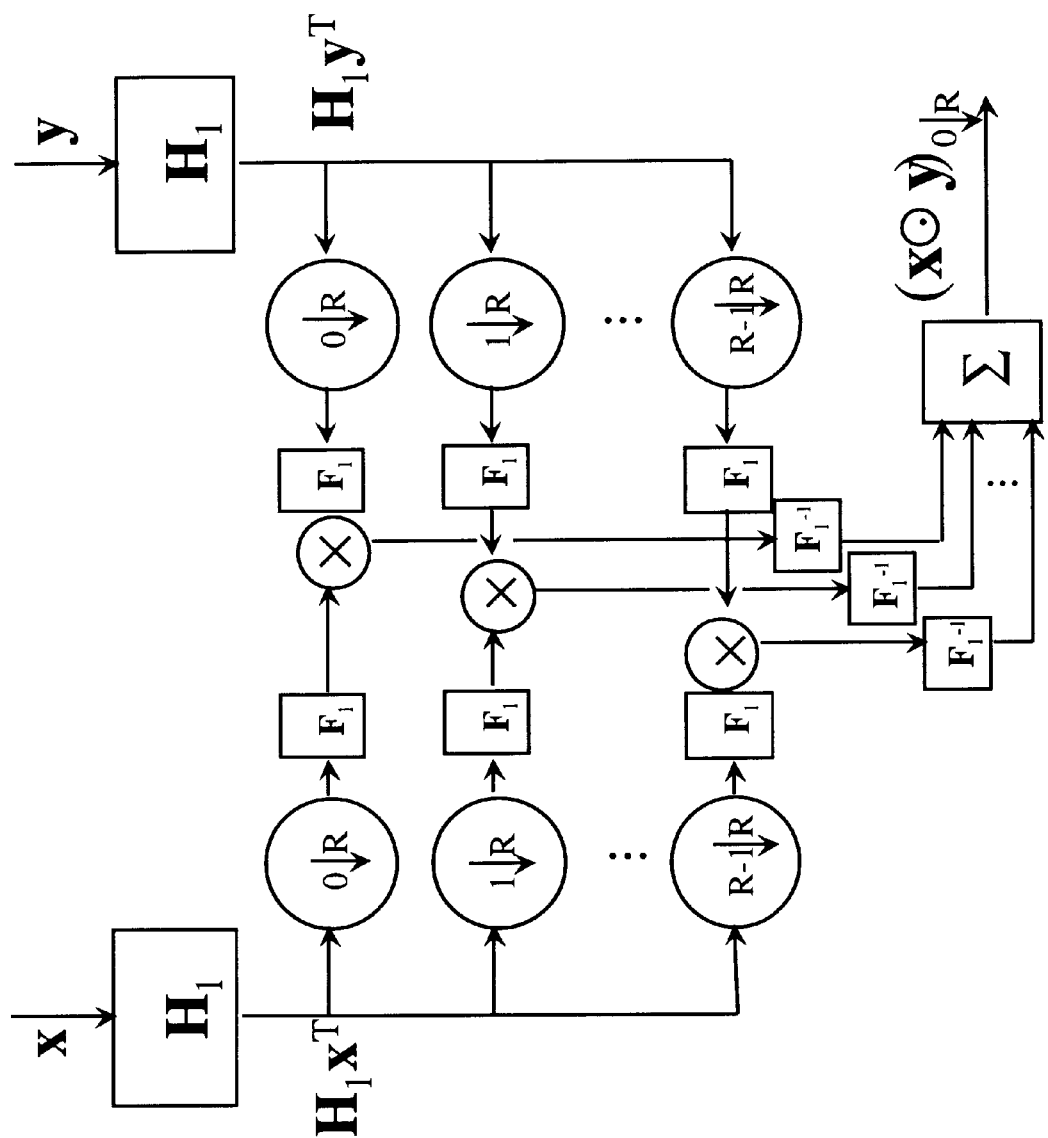
FIG. 4 is an illustration of the first step of a multiresolution method in accordance with the present invention.

With reference now to FIG. 4, there is shown the structure of the computation when the convolution theorem is applied to Vaidyanathan's theorem for a wavelet transform $H_1$ that is block-diagonal with identical blocks of size R on the diagonal.

Specifically, the R circular correlations are replaced by Fourier transforms $F_2$ that operate on vectors of size N/R. The component-by-component multiplies are followed by inverse Fourier transforms to produce Subband 0 of the circular correlation. Other subbands may be computed by applying this process recursively in a multiresolution analysis. The process is efficient because the cost in computation is no greater than the cost of inverting the wavelet transforms first, and following with the efficient implementation of circular correlations in the pixel domain by means of Fourier domains in that domain and component-by-component multiplication.

Figure 5:
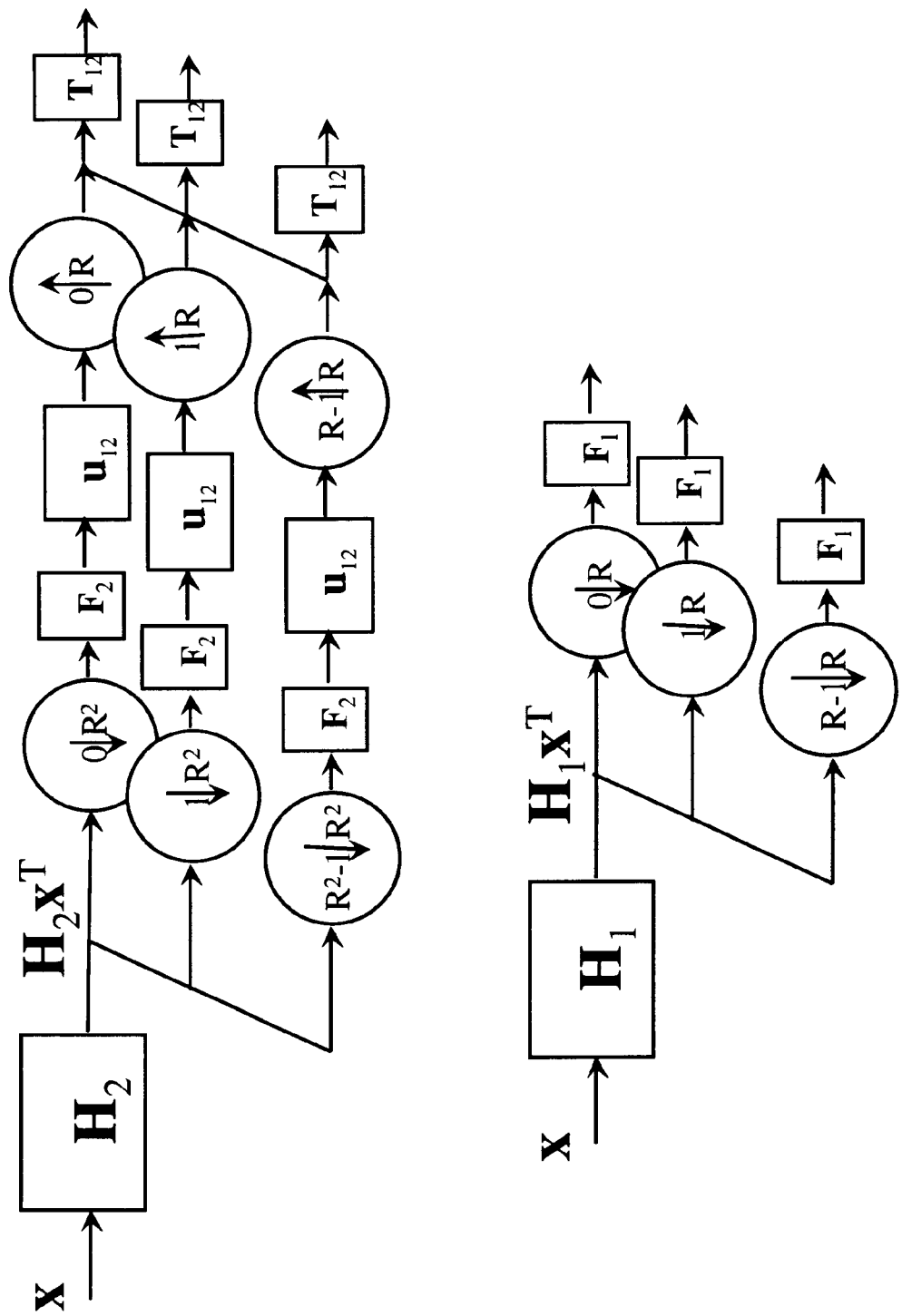
FIG. 5 is an illustration of the multiresolution method performed in a Fourier-wavelet domain in accordance with the present invention.

For a multiresolution analysis, the coefficients of Subband 0 mod $R^2$ are obtained as indicated in FIG. 4. There are $N/R^2$ such coefficients in each of $R^2$ subbands. Subsequently, the relation represented by FIG. 5 is applied thereby obtaining the coefficients of Subband 0 mod R. There are N/R of these coefficients, or R times as many as in the coarse analysis.

With further reference to FIG. 5, there are shown two equivalent operations. The upper part of FIG. 5 shows the subsampling of the H transform followed by a coarse Fourier transform ($F_2$), and then shows how to obtain the Fourier transforms for finer resolutions from the coarser ones. As shown in the Figure, the $R^2$ vectors of length $N/R^2$ are transformed by the matrices $U_{12}$. Each of these matrices is a square matrix of size $N/R^2$ and is a block of the update matrix $U_{12}$ that refines $H_2$ into $H_1$.

FIG. 5 shows that the coarse transforms are upsampled. The upsampling interlaces together $R^2$ vectors of length $N/R^2$ to create R vectors of length N/R. (Interlacing the vectors (1,3,5,7), (2,4,6,8), (9,11,13,15), by (10,12,14,16) by upsampling by 2, produces the vectors (1,9,3,11,5,13,7,15) and (2,10,4,12,6,14,8,16).)

After the upsampling, and as shown in the Figure, the resulting vectors are transformed by the matrix $T_{12}$. This matrix updates a fourier transform that operates on interlaced vectors of length $N/R^2$ to a fourier transform that operates on vectors of length N/R. That is, $T_{12}$ satisfies the equation:

$$F_1 = T_{12}(I_R \times F_2).$$

The "cross" operation in this equation indicates a matrix cross product, and in this case expresses the fact that $F_2$ is a fourier transform that is repeated and interlaced with a period of length R to create a matrix $F_1$ of size $N/R \times N/R$ from a matrix $F_2$ having size $N/R^2 \times N/R^2$. The number of operations required to perform $T_{12}$ on the output of the interlaced transforms $F_2$ is proportional to N/R. Those skilled in the art will recognize that the computation at the top is exactly equal to the computation at the bottom. That is, the effect of the fine transform $H_1$ followed by the fourier transform $F_1$ may be computed by using the update matrices $U_{12}$ and the fourier update matrix $T_{12}$ on the fourier transforms of the coarse wavelet transforms. The amount of work is substantially less by the computation at the top because the Fourier update matrix requires only N/R operations instead of N/R log N/R operations. Moreover, it is not necessary to compute the full inverse fourier transform in FIG. 4 to obtain the fine subbands of the circular correlation. It is necessary only to compute the subbands that have not yet been computed, and this requires less work. It requires one overall step with a number of operations proportional to N/R to do the global operations that affect all subbands, and then just the operations for the subbands that have not been computed. If R=2, then half of the outputs are in Subband 0, which is already known, and only half of the remaining computation of the inverse fourier transform has to be performed.

Advantageously, the multiresolution method of the present invention is recursive and can be repeated on any outputs shown in FIG. 5 to create a full resolution search. If the full resolution search is carried out, the amount of computation performed is precisely the same as if an inverse wavelet transform had been performed on the original image transforms, and then followed by a fourier transform from the pixel domain to the frequency domain, point-by-point mutliplication in the frequency domain, and an inverse fourier transform back to the pixel domain.

Figure 7:
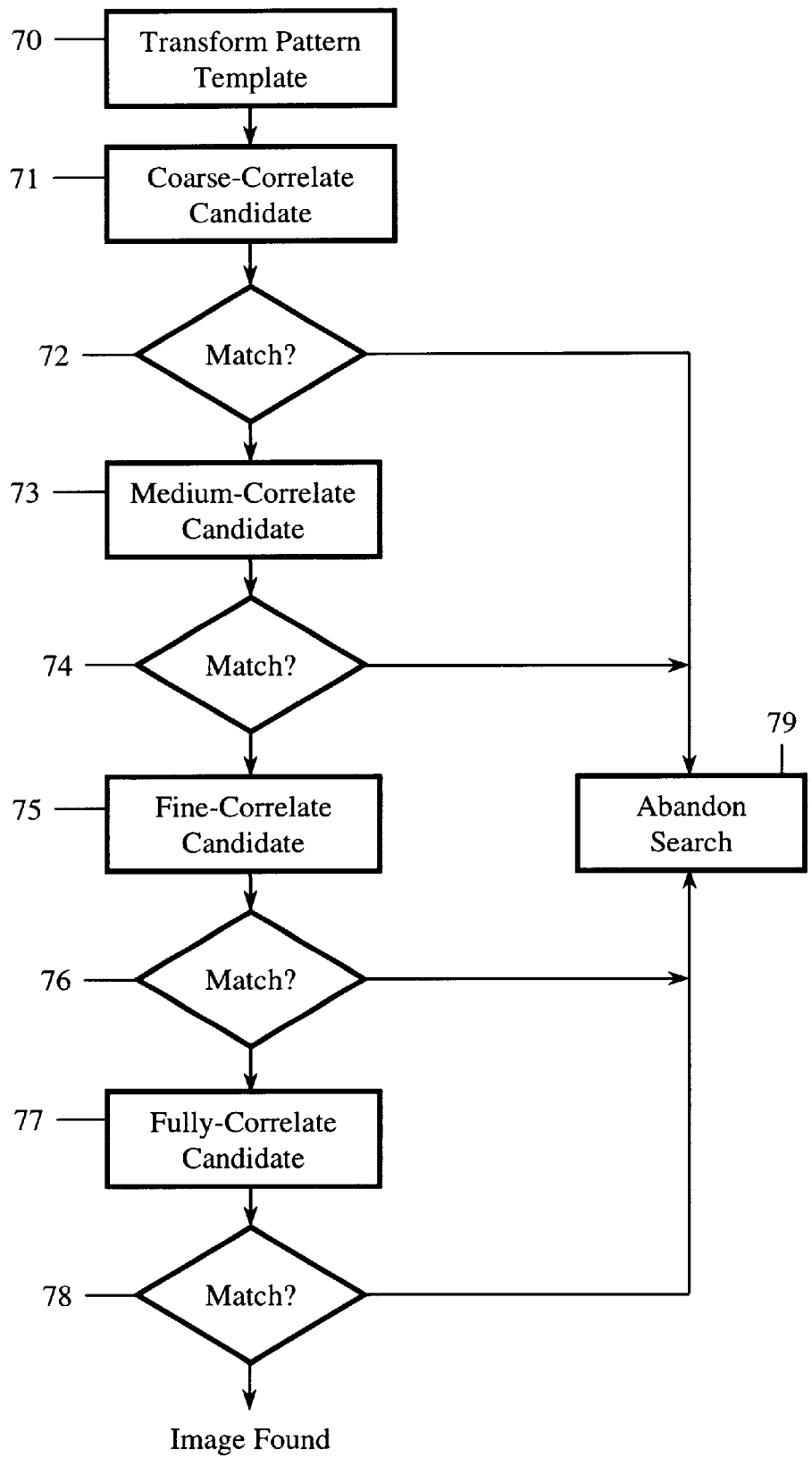
FIG. 7 is a flow diagram showing the steps performed for a multiresolution image search according to the present invention.

FIG. 7 provides an overview of the steps necessary to perform a multiresolution search according to the present invention. Specifically, for a particular image a pattern template is transformed into a wavelet pattern at block 70. A candidate image is then coarse correlated with the transformed pattern at block 71 and a determination is made at block 72 whether the transformed pattern suitably matches the candidate image. If not, then another candidate image may be chosen or the search abandoned, 79. If the match was suitable, then the candidate image is medium correlated 73 and another similar match test is performed at block 74. The procedure proceeds similarly through blocks 75 and 77 with fine correlated and fully correlated images respectively undergoing a suitable match check at blocks 77 and 78. If a suitable match is found for the fully correlated image at block 78, then the image searched for has been found.

In the discussion below, the following definitions are used:
1. The matrix $I_N$ is an identity matrix of size N×N.
2. The notation A×B denotes the matrix cross product of matrices A and B, and is sometimes called the Kronecker product.
3. The matrix $F_N$ is a Fourier transform matrix that operates on vectors of length N.
4. The matrix $F_{M,R}$ is an interlaced Fourier transform matrix with the structure $F_M \times I_R$, that is it has R interlaced copies of transforms of size M.
5. The matrix $T_{N,M,R}$ is a Fourier update matrix that transforms $F_{M,R}$ into $F_N$. That is, $F_N = T_{N,M,R} F_{M,R}$. Those skilled in the art will recognize that $T_{N,M,R}$ can be implemented by means of one stage of R-way butterfly operations.
6. The matrix $C_8$ is an 8×8 discrete cosine transform (DCT) matrix that is used to create transforms of 8×8 subimages in a JPEG representation of an image.
7. The matrix H is an N×N matrix with the structure $I_M \times C_8$, where N=8 M. The H matrix produces the JPEG transform of an image vector of length N.
8. The matrix W is a 2×2 Haar transform matrix. It is given by:

$$W = \begin{bmatrix} 1 & 1 \\ 1 & -1 \end{bmatrix}$$

9. The matrix $V_2 = I_4 \times W$ consists of 4 interlaced copies of W, and is of size 8×8.
10. The matrix $V_{4,2}$ has the structure $V_{4,2} = I_2 \times (W \times I_2)$. Those skilled in the art will recognize that the matrix $V_4 = I_2 \times (W \times W)$ satisfies the equality $V_4 = V_{4,2} V_2$.
11. The matrix $V_{8,4}$ satisfies the equality $C_8 = V_{8,4} V_{4,2} V_2$. Those skilled in the art can confirm that $V_{8,4}$ satisfies the equation $V_{8,4} = V(W \times I_4)$ where V is the matrix below:

$$V = \begin{bmatrix} 1 & 0 & 0 & 0 & 0 & 0 & 0 & 0 \\ 0 & 0.180 & 0 & 0.213 & 0 & 0.318 & 0 & 0.906 \\ 0 & 0.375 & 0 & 0768 & 0 & -0.513 & 0 & -0.075 \\ 0 & 0 & 0 & 0 & 1 & 0 & 0 & 0 \\ 0 & 0.0906 & 0 & -0.318 & 0 & 0.213 & 0 & -0.180 \\ 0 & 0 & 0.383 & 0 & 0 & 0 & 0.924 & 0 \\ 0 & 0 & 0.924 & 0 & 0 & 0 & -0.383 & 0 \\ 0 & -0.075 & 0 & -0.513 & 0 & 0.768 & 0 & -0.375 \end{bmatrix}$$

For a given image stored in JPEG format, a preferred multiresolution analysis that uses the invention is described as follows.
1) To correlate an N-vector image x stored as a JPEG transform $Hx^T$ with an instance of a pattern y, extend the pattern to the same length as x and compute its JPEG transform $Hy^T$.
2) Coarse correlation—Generate the Fourier transforms $F_{M,8}Hx^T$ and $\hat{F}_{M,8}Hy^T$. Multiply the transforms point-bypoint and partition them into the appropriate number of subbands of length M. Add these vectors, and take the inverse Fourier transform of the sum. For this example, every eighth point of the correlation is generated.

3) Medium correlation—Multiply $F_{M,8}Hx^T$ by $(T_{2M,M,8} \times I_4)$ $(W \times I_4)V^{-1}$ and $\hat{F}_{M,8}Hy^T$ by $(\hat{T}_{2M,M,8} \times I_4)$ $(W \times I_4)V^{-1}$ thereby producing four interlaced Fourier transforms of size 2M. Multiply the resulting vectors point-by-point, and partition them into four subbands.

Add the subbands, thereby creating a single vector of length 2M. Take the inverse Fourier transform of size 2M, but after a first butterfly, operate only on elements that produce an odd component of the result. This yields a correlation at indices that are multiples of 4 mod 8 of the full correlation.

4) Fine correlation—Multiply the x and y transforms of the preceding step by $(T_{4M,2M,4} \times I_2)V_{4,2}$ and $(\hat{T}_{4M,2M,4} \times I_2)V_{4,2}$, respectively. Each vector consists of two interlaced Fourier transforms of size 4M. Multiply these transforms point-by-point, partition into two subbands and add the subbands. Take the inverse Fourier transform of the result, and after the first butterfly stage, compute only the terms that contribute to the odd results. This produces the components of the correlation whose indices are equal to 2 mod 8 and 6 mod 8.

5) Full resolution—For the final step, multiply the x and y transforms from the last step by $T_{8M,4M,2}V_2$ and $\hat{T}_{8M,4M,2}V_2$, respectively. Repeat the analysis noting that there is a single subband of length N=8M in the transform vectors and in the transform of the correlation product.

At this point, a number of advantages resulting from the multiresolution analysis of the present invention are apparent to those skilled in the art. Specifically, if the search is not going to succeed, and this is discovered early, the search can be terminated early in the multiresolution analysis, because match information is obtained early in the search. If the transforms to the image domain are done first rather than performing multiresolution analysis, then the work is committed before any information is used, and the cost cannot be avoided later as search information is discovered. The wavelet representations tend to be sparse, that is, they contain many zeros, and this can reduce computational cost. The pixel domain representation is not sparse, because virtually all the pixels are nonzero. Consequently, it may be possible to exploit the sparsity in the wavelet domain and equivalent exploitation is not possible in the pixel domain.

Those skilled in the art can appreciate that these results may be readily extended to more general matrices. Specifically, the results extend to right block-circulant matrices. A right circulant matrix X is a square matrix in which each row is the same as the immediately preceding row, except that it is shifted cyclically to the right by 1 position. For example, the matrix X below is right circulant.

$$X = \begin{bmatrix} 0 & 5 & 2 & 7 \\ 7 & 0 & 5 & 2 \\ 2 & 7 & 0 & 5 \\ 5 & 2 & 7 & 0 \end{bmatrix}$$

A right block-circulant matrix is a matrix composed of equal-sized submatrices (blocks), and each row of blocks is the same as previous row of blocks, except that it is shifted to the right by the size of 1 block. The matrix Y below is right-block circulant with a block size of 2.

$$Y = \begin{bmatrix} 1 & 1 & 1 & 1 & 0 & 0 & 0 & 0 \\ 1 & -1 & 0 & 1 & -2 & 0 & 0 & 0 \\ 0 & 0 & 1 & 1 & 1 & 1 & 0 & 0 \\ 0 & 0 & 1 & -1 & 0 & 1 & -2 & 0 \\ 0 & 0 & 0 & 0 & 1 & 1 & 1 & 1 \\ -2 & 0 & 0 & 0 & 1 & -1 & 0 & 1 \\ 1 & 1 & 0 & 0 & 0 & 0 & 1 & 1 \\ 0 & 1 & -2 & 0 & 0 & 0 & 1 & -1 \end{bmatrix}$$

The equality depicted in FIG. 5 holds for block diagonal wavelet transform matrices whose diagonal blocks are equal, and they must satisfy the equation $H H^T = H^T H = I$. Although these are common wavelet transforms, as, for example, the Haar wavelet, they do not represent the broadest class of wavelets in use. The wavelets of most interest have a transform equation that is right block-circulant, as, for example, the Debauchies wavelets. The modified form of FIG. 5 for such wavelets is computationally just as simple, but it is slightly different and is given in FIG. 6.

Figure 6:
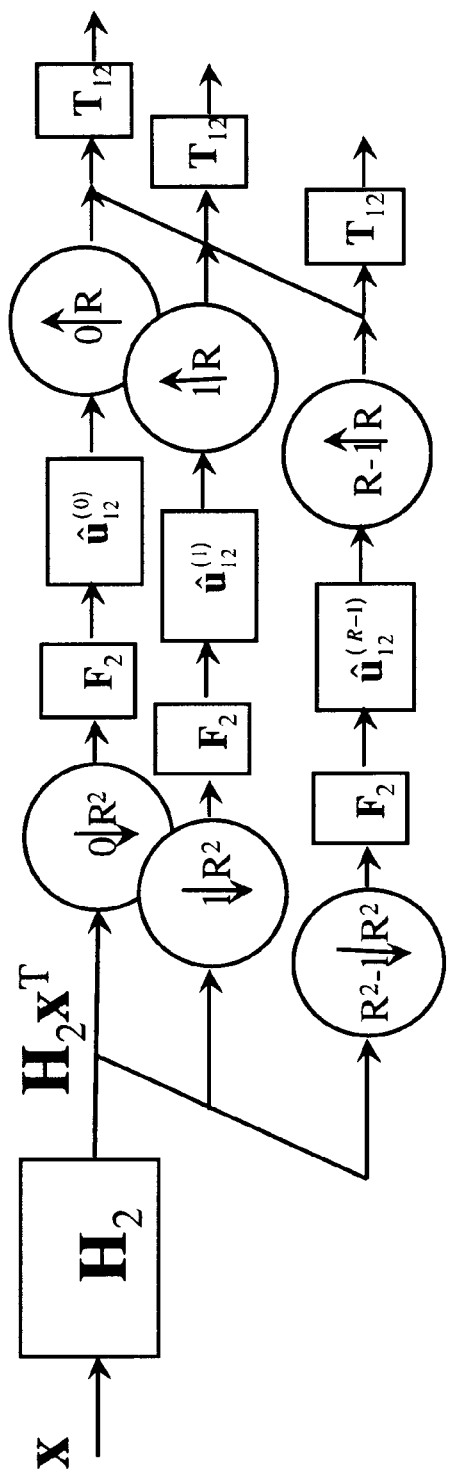
FIG. 6 is an illustration of a multiresolution method performed on right block-circulant matrices.
Figure 6:
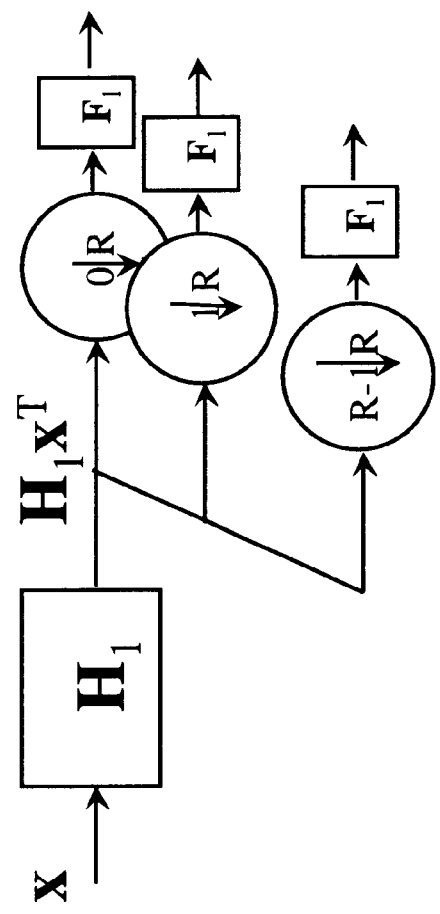

The principle difference between the two figures lies in the update matrices $u_{12}$ and $\hat{u}_{12}^{(i)}$. In FIG. 5, $u_{12}$ is a subblock of the update matrix $U_{12}$, and can be obtained directly that matrix. Moreover, each instance of $u_{12}$ in FIG. 5 uses the same matrix $u_{12}$ for the computation. In FIG. 6, the matrix $\hat{u}_{12}^{(i)}$ has to be calculated from $U_{12}$, and the entries in the matrix $\hat{u}_{12}^{(i)}$ depend on the subband that it transforms. The matrices $\hat{u}_{12}^{(i)}$ can be computed by the formula:

$$\hat{U}_{12} = (F_2 \times I_{R^2}) U_{12} (F_2^{-1} \times I_{R^2})$$

where $F_2$ is the Fourier transform in FIG. 5 and 6 that transforms vectors of length $N/R^2$ and the matrix cross product operation interlaces $R^2$ copies of this matrix together across $R^2$ vectors of length $N/R^2$. The matrix $\hat{U}_{12}$ is block diagonal, and within its blocks along diagonal lines it contains Fourier transforms of the rows of $\hat{U}_{12}$. For a search of one pattern over many images of the same size, the matrices $\hat{u}_{12}$ can be computed once and stored reused when searching each image.

While there has been described and illustrated a method and apparatus for searching a database of images for a particular image, it will be apparent to those skilled in the art that modifications and variations are possible without deviating from the broad principle and spirit of the invention which shall be limited solely by the scope of the claims appended hereto.

What is claimed is:

1. A content-based image search method for determining whether a candidate image matches a pattern template, the method comprising the steps of:

(a) transforming the pattern template into a wavelet pattern;

(b) transforming the candidate image into a wavelet candidate image at a first resolution;

(c) correlating the wavelet candidate image with the wavelet pattern in the Fourier domain and at the first resolution to produce a first-resolution correlation comprising a plurality of values;

(d) thresholding the first-resolution correlation by comparing each first-resolution correlation value to a predetermined first-resolution threshold value to determine whether any first-resolution correlation value meets or exceeds the first-resolution threshold value and, if so, proceeding with steps (e) through (f);

(e) correlating the wavelet candidate image with the wavelet pattern at a second resolution, utilizing at least a portion of calculations performed in the first-resolution correlation of step (c), to produce a second-resolution correlation comprising a plurality of values, the second resolution being finer than the first resolution; and (f) thresholding the second-resolution correlation by comparing each second-resolution correlation value to a predetermined second-resolution threshold value to determine whether any second-resolution correlation value meets or exceeds the second-resolution threshold value.

2. An apparatus for performing a content-based image search for determining whether a candidate image matches a pattern template, the apparatus comprising:

(a) means for transforming the pattern template into a wavelet pattern template;

(b) means for transforming the candidate image into a wavelet candidate image at a first resolution;

(c) means for correlating the wavelet candidate image with the wavelet pattern in the Fourier domain and at the first resolution to produce a first-resolution correlation comprising a plurality of values;

(d) means for thresholding the first-resolution correlation by comparing each first-resolution correlation value to a predetermined first-resolution threshold value to determine whether any first-resolution correlation value meets or exceeds the first-resolution threshold value;

(e) means for correlating the wavelet candidate image with the wavelet pattern at a second resolution, utilizing at least a portion of calculations performed in the first-resolution correlation by the means for correlating at the first resolution (c), to produce a second-resolution correlation comprising a plurality of values, the second resolution being finer than the first resolution, said means for correlating (e) being responsive to the means for thresholding (d) and being activated only if the means for thresholding (d) determines that any first-resolution correlation value meets or exceeds the first-resolution threshold value; and (f) means for thresholding the second-resolution correlation by comparing each second-resolution correlation value to a predetermined second-resolution threshold value to determine whether any second-resolution correlation value meets or exceeds the second-resolution threshold value.

3. The method of claim 1, further comprising the step of:
(g) determining that a suitable match exists between the candidate image and the pattern template if any second-resolution correlation value meets or exceeds the second-resolution threshold value.

4. The method of claim 3, wherein the second-resolution correlation is fully correlated.

5. The method of claim 1, wherein the first-resolution threshold value is equal to the second-resolution threshold value.

6. The method of claim 1, wherein the first-resolution threshold value is not equal to the second-resolution threshold value.

7. The method of claim 1, further comprising the steps of:
(g) correlating the wavelet candidate image with the wavelet pattern at a third resolution, utilizing at least a portion of calculations performed in the second-resolution correlation of step (e), to produce a third-resolution correlation comprising a plurality of values, the third resolution being finer than the second resolution; and (h) thresholding the third-resolution correlation by comparing each third-resolution correlation value to a predetermined third-resolution threshold value to determine whether any second-resolution correlation value meets or exceeds the third-resolution threshold value.

8. The method of claim 7, further comprising the step of:
(i) determining that a suitable match exists between the candidate image and the pattern template if any third-resolution correlation value meets or exceeds the third-resolution threshold value.

9. The method of claim 8, wherein the final-resolution correlation is fully correlated.

10. The method of claim 7, wherein the first-resolution threshold value, the second-resolution threshold value, and the third-resolution threshold value are all equal.

11. The method of claim 7, wherein the first-resolution threshold value, the second-resolution threshold value, and the third-resolution threshold value are not all equal.

12. The method of claim 1, further comprising the steps of:
(g) correlating the wavelet candidate image with the wavelet pattern at a current resolution that is a finer resolution than the resolution of the previous correlation, utilizing at least a portion of calculations performed in the previous correlation, to produce a current-resolution correlation comprising a plurality of values;

(h) thresholding the current-resolution correlation by comparing each current-resolution correlation value to a predetermined current-resolution threshold value to determine whether any current-resolution correlation value meets or exceeds the current-resolution threshold value;

(i) repeating steps (g) and (h) at successively finer resolutions so long as it is determined that any current-resolution correlation value meets or exceeds the current-resolution threshold value for that correlation in step (h) until a desired final resolution is attained; and (j) determining that a suitable match exists between the candidate image and the pattern template if any final-resolution correlation value meets or exceeds a predetermined final-resolution threshold value.

13. The method of claim 12, wherein the final-resolution correlation is fully correlated.

14. The method of claim 12, wherein the first-resolution threshold value, the second-resolution threshold value, each of the current-resolution threshold values and the final-resolution threshold value are all equal.

15. The method of claim 12, wherein the first-resolution threshold value, the second-resolution threshold value, each of the current-resolution threshold values and the final-resolution threshold value arc not all equal.

16. The apparatus of claim 2, further comprising:
(g) means for determining that a suitable match exists between the candidate image and the pattern template if any second-resolution correlation value meets or exceeds the second-resolution threshold value.

17. The apparatus of claim 16, wherein the second-resolution correlation is fully correlated.

18. The apparatus of claim 2, wherein the first-resolution threshold value is equal to the second-resolution threshold value.

19. The apparatus of claim 2, wherein the first-resolution threshold value is not equal to the second-resolution threshold value.

20. The apparatus of claim 2, further comprising:
(g) means for correlating the wavelet candidate image with the wavelet pattern at a third resolution, utilizing at least a portion of calculations performed in the second-resolution correlation by the means for correlating at the second resolution (e), to produce a third-resolution correlation comprising a plurality of values, the third resolution being finer than the second resolution; and
(h) means for thresholding the third-resolution correlation by comparing each third-resolution correlation value to a predetermined threshold value to determine whether any second-resolution correlation value meets or exceeds the third-resolution threshold value.

21. The apparatus of claim 20, further comprising:
(i) means for determining that a suitable match exists between the candidate image and the pattern template if any third-resolution correlation value meets or exceeds the third-resolution threshold value.

22. The apparatus of claim 21, wherein the final-resolution correlation is fully correlated.

23. The apparatus of claim 20, wherein the first-resolution threshold value, the second-resolution threshold value, and the third-resolution threshold value are all equal.

24. The apparatus of claim 20, wherein the first-resolution threshold value, the second-resolution threshold value, and the third-resolution threshold value are not all equal.

25. The apparatus of claim 2, further comprising:
(g) means for correlating the wavelet candidate image with the wavelet pattern at a current resolution that is a finer resolution than that of the previous correlation, utilizing at least a portion of calculations performed in the previous correlation, to produce a current-resolution correlation comprising a plurality of values;
(h) means for thresholding the current-resolution correlation by comparing each current-resolution correlation value to a predetermined current-resolution threshold value to determine whether any finer-resolution correlation value meets or exceeds the current-resolution threshold value;
(i) means for repeating the processing performed by the means for correlating (g) and the means for thresholding (h) at successively finer resolutions so long as it is determined that any current-resolution correlation value meets or exceeds the current-resolution threshold value for that correlation as determined by the means for thresholding (h) until a desired final resolution is attained; and
(j) means for determining that a suitable match exists between the candidate image and the pattern template if any final-resolution correlation value meets or exceeds a predetermined final-resolution threshold value.

26. The apparatus of claim 25, wherein the final-resolution correlation is fully correlated.

27. The apparatus of claim 25, wherein the first-resolution threshold value, the second-resolution threshold value, each of the current-resolution threshold values and the final-resolution threshold value are all equal.

28. The apparatus of claim 25, wherein the first-resolution threshold value, the second-resolution threshold value, each of the current-resolution threshold values and the final-resolution threshold value are not all equal.

29. A content-based image search method for determining whether a candidate image matches a pattern template, the method comprising the steps of:
(a) transforming the pattern template into a wavelet pattern comprising a plurality of pattern sub-bands at a first resolution;
(b) transforming the candidate image into a wavelet image comprising a plurality of image sub-bands at the first resolution;
(c) correlating the first-resolution wavelet image and the wavelet pattern, including the sub-steps of:
(c1) transforming all pattern sub-bands of the first-resolution wavelet pattern into the Fourier domain to produce a Fourier-transformed first-resolution pattern;
(c2) transforming all image sub-bands of the first-resolution wavelet image into the Fourier domain to produce a Fourier-transformed first-resolution image;
(c3) correlating the Fourier-transformed first-resolution image and the Fourier-transformed first-resolution pattern on a sub-band to sub-band basis in the Fourier domain to produce a first-resolution Fourier-domain sub-band correlation for each sub-band;
(c4) summing the first-resolution Fourier domain sub-band correlations to produce a first-resolution Fourier domain correlation;
(c5) inverting the first-resolution Fourier domain correlation into the pixel domain to produce a first-resolution pixel domain correlation comprising a plurality of correlation values, each correlation value being associated with a pixel position;
(c6) comparing the correlation value of the first-resolution pixel domain correlation at each pixel position with a first predetermined threshold to determine which pixel positions exceed the first threshold, thereby indicating the pixel positions of a potential match;
(d) if at least one potential match is indicated in step (c6), correlating again at a current resolution which is a finer resolution than the previous resolution, including the sub-steps of:
(d1a) performing a one-step wavelet inversion of the Fourier transforms of the previous-resolution pattern sub-bands to form an intermediate Fourier-transformed current-resolution pattern;
(d1b) butterfly transforming the intermediate Fourier-transformed current-resolution pattern to create a full Fourier-transformed current-resolution pattern;
(d2a) performing a one-step wavelet inversion of the Fourier transforms of the previous-resolution sub-bands of the image to form an intermediate Fourier-transformed current-resolution image;
(d2b) butterfly transforming the intermediate Fourier-transformed current-resolution candidate image to create a full Fourier-transformed current-resolution candidate image;
(d3) correlating the full Fourier-transformed current-resolution pattern and the full Fourier-transformed current-resolution image on a sub-band to sub-band basis in the Fourier domain to produce a current-resolution Fourier-domain sub-band correlation for each sub-band;
(d4) if the current resolution is not a final desired resolution, summing the current-resolution Fourier domain sub-band correlations to produce a current-resolution Fourier domain correlation;

(d5) inverting the current-resolution Fourier domain correlation into the pixel domain to produce a current-resolution pixel domain correlation comprising a plurality of correlation values, each correlation value being associated with a pixel position;

(d6) comparing the correlation value of the current-resolution pixel domain correlation at each pixel position with a current-resolution predetermined threshold to determine which pixel positions exceed the current-resolution threshold, thereby indicating the pixel positions of a potential match; and (e) repeating step (d), including the sub-steps (d1a) through (d6), at successively finer resolutions so long as at least one potential match is indicated in step (d6) and until the current resolution is the desired final resolution, wherein the comparing step (d6) at the final resolution indicates the pixel positions of any match between the candidate image and the pattern template.

30. The method of claim 29, wherein the first-resolution threshold value, and each of the current-resolution threshold values including the final-resolution threshold value, are all equal.

31. The method of claim 29, wherein the first-resolution threshold value, and each of the current-resolution threshold values including the final-resolution threshold value, are not all equal.

32. A content-based image search apparatus for determining whether a candidate image matches a pattern template, the apparatus comprising:

(a) means for transforming the pattern template into a wavelet pattern comprising a plurality of pattern sub-bands at a first resolution;

(b) means for transforming the candidate image into a wavelet image comprising a plurality of image sub-bands at the first resolution;

(c) means for correlating the first-resolution wavelet image and the wavelet pattern, comprising:

(c1) means for transforming all pattern sub-bands of the first-resolution wavelet pattern into the Fourier domain to produce a Fourier-transformed first-resolution pattern;

(c2) means for transforming all image sub-bands of the first-resolution wavelet image into the Fourier domain to produce a Fourier-transformed first-resolution image;

(c3) means for correlating the Fourier-transformed first-resolution image and the Fourier-transformed first-resolution pattern on a sub-band to sub-band basis in the Fourier domain to produce a first-resolution Fourier-domain sub-band correlation for each sub-band;

(c4) means for summing the first-resolution Fourier domain sub-band correlations to produce a first-resolution Fourier domain correlation;

(c5) means for inverting the first-resolution Fourier domain correlation into the pixel domain to produce a first-resolution pixel domain correlation comprising a plurality of correlation values, each correlation value being associated with a pixel position;

(c6) means for comparing the correlation value of the first-resolution pixel domain correlation at each pixel position with a first predetermined threshold to determine which pixel positions exceed the first threshold, thereby indicating the pixel positions of a potential match;

(d) means for correlating again at a current resolution which is a finer resolution than the previous resolution, the means for correlating again being responsive to at least one of the means for comparing (c6) and the means for comparing (d6) and being activated only if at least one potential match is indicated by the means for comparing (c6) or the means for comparing (d6) at the previous resolution, comprising:

(d1a) means for performing a one-step wavelet inversion of the Fourier transforms of the previous-resolution pattern sub-bands to form an intermediate Fourier-transformed current-resolution pattern;

(d1b) means for butterfly transforming the intermediate Fourier-transformed current-resolution pattern to create a full Fourier-transformed current-resolution pattern;

(d2a) means for performing a one-step wavelet inversion of the Fourier transforms of the previous-resolution sub-bands of the image to form an intermediate Fourier-transformed current-resolution image;

(d2b) means for butterfly transforming the intermediate Fourier-transformed current-resolution candidate image to create a full Fourier-transformed current-resolution candidate image;

(d3) means for correlating the full Fourier-transformed current-resolution pattern and the full Fourier-transformed current-resolution image on a sub-band to sub-band basis in the Fourier domain to produce a current-resolution Fourier-domain sub-band correlation for each sub-band;

(d4) means for summing the current-resolution Fourier domain sub-band correlations to produce a current-resolution Fourier domain correlation if the current resolution is not a final desired resolution;

(d5) means for inverting the current-resolution Fourier domain correlation into the pixel domain to produce a current-resolution pixel domain correlation comprising a plurality of correlation values, each correlation value being associated with a pixel position;

(d6) means for comparing the correlation value of the current-resolution pixel domain correlation at each pixel position with a current-resolution predetermined threshold to determine which pixel positions exceed the current-resolution threshold, thereby indicating the pixel positions of a potential match; and (e) means for repeating the processing performed by the means for correlating again (d), including the components (d1a) through (d6), at successively finer resolutions so long as at least one potential match is indicated by the means for comparing (d6) and until the current resolution is the desired final resolution, wherein the means for comparing (d6) at the final resolution indicates the pixel positions of any match between the candidate image and the pattern template.

33. The apparatus of claim 32, wherein the first-resolution threshold value, and each of the current-resolution threshold values including the final-resolution threshold value, are all equal.

34. The apparatus of claim 32, wherein the first-resolution threshold value, and each of the current-resolution threshold values including the final-resolution threshold value, are not all equal.

* * * * *